United States Patent
Huwyler et al.

(10) Patent No.: US 10,202,950 B2
(45) Date of Patent: Feb. 12, 2019

(54) TEMPERATURE VARYING CIRCULATION SYSTEM FOR USE WITH ALTERNATIVE FUELS

(71) Applicant: Optimus Technologies, LLC, Pittsburgh, PA (US)

(72) Inventors: Colin N. Huwyler, Pittsburgh, PA (US); Jonathan Ewing, Pittsburgh, PA (US)

(73) Assignee: Optimus Technologies, Inc., Pittsburgh, PA (US)

( * ) Notice: Subject to any disclaimer, the term of this patent is extended or adjusted under 35 U.S.C. 154(b) by 674 days.

(21) Appl. No.: 14/745,333

(22) Filed: Jun. 19, 2015

(65) Prior Publication Data
US 2015/0369186 A1 Dec. 24, 2015

Related U.S. Application Data

(63) Continuation-in-part of application No. 14/677,917, filed on Apr. 2, 2015.

(60) Provisional application No. 62/014,497, filed on Jun. 19, 2014.

(51) Int. Cl.
| | | |
|---|---|---|
| *F02P 9/00* | (2006.01) | |
| *F02M 37/00* | (2006.01) | |
| *F02M 31/16* | (2006.01) | |
| *F02D 19/06* | (2006.01) | |

(52) U.S. Cl.
CPC ..... *F02M 37/0064* (2013.01); *F02D 19/0652* (2013.01); *F02D 19/0668* (2013.01); *F02M 31/16* (2013.01); *F02M 37/0082* (2013.01); *F02M 37/0088* (2013.01); *F01P 2060/10* (2013.01); *F01P 2060/18* (2013.01); *Y02T 10/126* (2013.01); *Y02T 10/36* (2013.01)

(58) Field of Classification Search
CPC ............... F02M 37/0064; F02M 31/16; F02M 37/0082; F02M 37/0088; F02M 37/223; F02D 19/0668; F02D 19/0652; F01P 2060/10; F01P 2060/18; Y02T 10/126; Y02T 10/36
USPC .......................................... 123/543, 557, 558
See application file for complete search history.

(56) References Cited

U.S. PATENT DOCUMENTS 4,237,850 A * 12/1980 Connor .................. F02M 31/16
123/557
2008/0262701 A1* 10/2008 Williams ............ F02D 19/0628
701/103

FOREIGN PATENT DOCUMENTS

JP            08093579 A  *  4/1996

* cited by examiner

*Primary Examiner* — Hung Q Nguyen
(74) *Attorney, Agent, or Firm* — Carl A. Ronald

(57) ABSTRACT

The present invention is a system and method for modifying an engine for use with an alternative fuel that needs to be conditioned. Coolant is diverted from the original engine heater core and is used to heat or condition the alternative fuel both in the alternative fuel tank and in a special manifold that heats and circulates the fuel before delivering it to the engine. An electronic control unit monitors the temperature and pressure to ensure proper viscosity and engine operation.

20 Claims, 5 Drawing Sheets

TEMPERATURE VARYING CIRCULATION SYSTEM FOR USE WITH ALTERNATIVE FUELS

CROSS-REFERENCE TO RELATED APPLICATION

This application claims the benefit of U.S. Provisional Patent Application Ser. No. 62/014,497 entitled "Temperature Varying Circulation System for Use with Auxiliary Fluids" filed on Jun. 19, 2014, and U.S. patent application Ser. No. 14/677,917 entitled "Method and Apparatus for Modifying an OEM Fuel System for Bi-Fuel Use" filed on Apr. 23, 2015, the contents of which are incorporated by reference as if fully set forth herein.

FIELD OF INVENTION

The present invention relates to fuel delivery systems for internal combustion engines and more particularly, fuel delivery systems utilizing more than one type of fuel for internal combustion.

BACKGROUND OF INVENTION

A bi-fuel delivery system, as used herein, is understood to be any engine system that is capable of operating on two different types of fuel. Conversion from a mono-fuel system, such as a diesel fuel combustion engine commonly found in heavy-duty trucks and buses sold by large-scale manufacturers of such vehicles, to a bi-fuel system is advantageous because the alternative fuels used, such as bio-diesel, vegetable oil and renewable diesel, are more environmentally friendly and sustainable and typically result in the reduction of total operational costs and lower vehicle emissions. There are, however, several challenges to converting a mono-fuel system into a bi-fuel system.

One problem with current bi-fuel systems is that when one of the fuel supplies is selected, the other fuel stagnates in the fuel supply lines. This means that when that fuel is selected again, it may have turned to gel or it may simply not be introduced into the engine at an optimal temperature for combustion. Because the fuel delivery system isn't temperature-conditioned in current systems, the use of certain types of fuel such as higher viscosity fuels, can result in excessive engine system wear, shorter engine life and reduced fuel efficiency.

The present invention pertains to temperature-conditioned fuel delivery in engine systems, such as diesel fuel combustion engines. More specifically, embodiments of the present invention have been designed for use with alternative, higher viscosity fuel types. One skilled in the art will appreciate and recognize that certain components are unique to the present invention and that derivative embodiments can be applicable to various types of engine systems and fuel types.

SUMMARY OF THE INVENTION

The present invention functions in conjunction with original equipment (OEM) components to produce a bi-fuel system in which more cost effective, renewable fuels can be utilized as a substitute for conventional fuel. The challenge to using these alternative fuels has been their tendency to congeal in cold climates. To combat these effects, embodiments of the present invention add a heat source and a separate circulatory system to the OEM fuel system in order to maintain an appropriate temperature for the alternative fuel so that it will optimally flow through the transport vessels to the engine system.

The primary objective of the present invention is to selectively circulate temperature-conditioned fuel from a storage reservoir through a closed loop system and back to the storage reservoir so that it can be brought to an optimal temperature prior to being delivered to the engine. In an embodiment, the present invention is a fuel circulation system that is capable of carrying the alternative fuel from a temperature-conditioned storage reservoir, through one or more fuel conditioning units, to a selector valve and back to the temperature conditioned storage reservoir, or, optionally, to the engine for combustion. This separate fuel conditioning path allows for the fuel to receive temperature conditioning and to be constantly circulated, with an end of reaching the pre-determined optimum temperature prior to delivery to the engine system.

The present invention includes an array of selector valves that actuate when the fuel reaches optimum conditioning temperature. In order to ensure proper transport vessel pressure, the selector valve closes when the fuel reaches engine system operating temperature, thus creating an increase in fuel pressure. In a preferred embodiment, the selector valve stays closed until the alternative fuel pressure matches the OEM fuel delivery pressure. These parameters are continuously monitored by the system and are set utilizing good engineering judgment.

In an embodiment, the present invention is a closed loop system, which primarily functions as an early stage incubator for unconditioned fuel to reach an optimal temperature. When the engine is started, it runs on the fuel that was originally recommended, such as diesel, and the alternative fuel conditioning system begins to circulate the alternative fuel within a separate circuit. Once the alternative fuel reaches a pre-determined optimal temperature, such as between 65 and 80 degrees Celsius, a selector valve actuates and the alternative fuel displaces the originally-recommended fuel. The one or more selector valves may be controlled either by mechanical or software cues given by the engine system operator or directly from an electronic control module.

BRIEF DESCRIPTION OF THE DRAWINGS

The drawings shown below illustrate multiple configurations that enable temperature-conditioned fuel delivery and accomplish the objectives set forth herein in utilizing multiple embodiments of the present invention. One skilled in the art of fuel delivery would be able to discern the efficacy of each configuration and their associated applicability.

DETAILED DESCRIPTION OF THE INVENTION

The following detailed description includes the best currently contemplated modes of carrying out exemplary embodiments of the invention. The description is not to be taken in a limiting sense, but is made merely for the purpose of illustrating the general principles of the invention, since the scope of the invention is best defined by the claims included herein.

Figure 1:
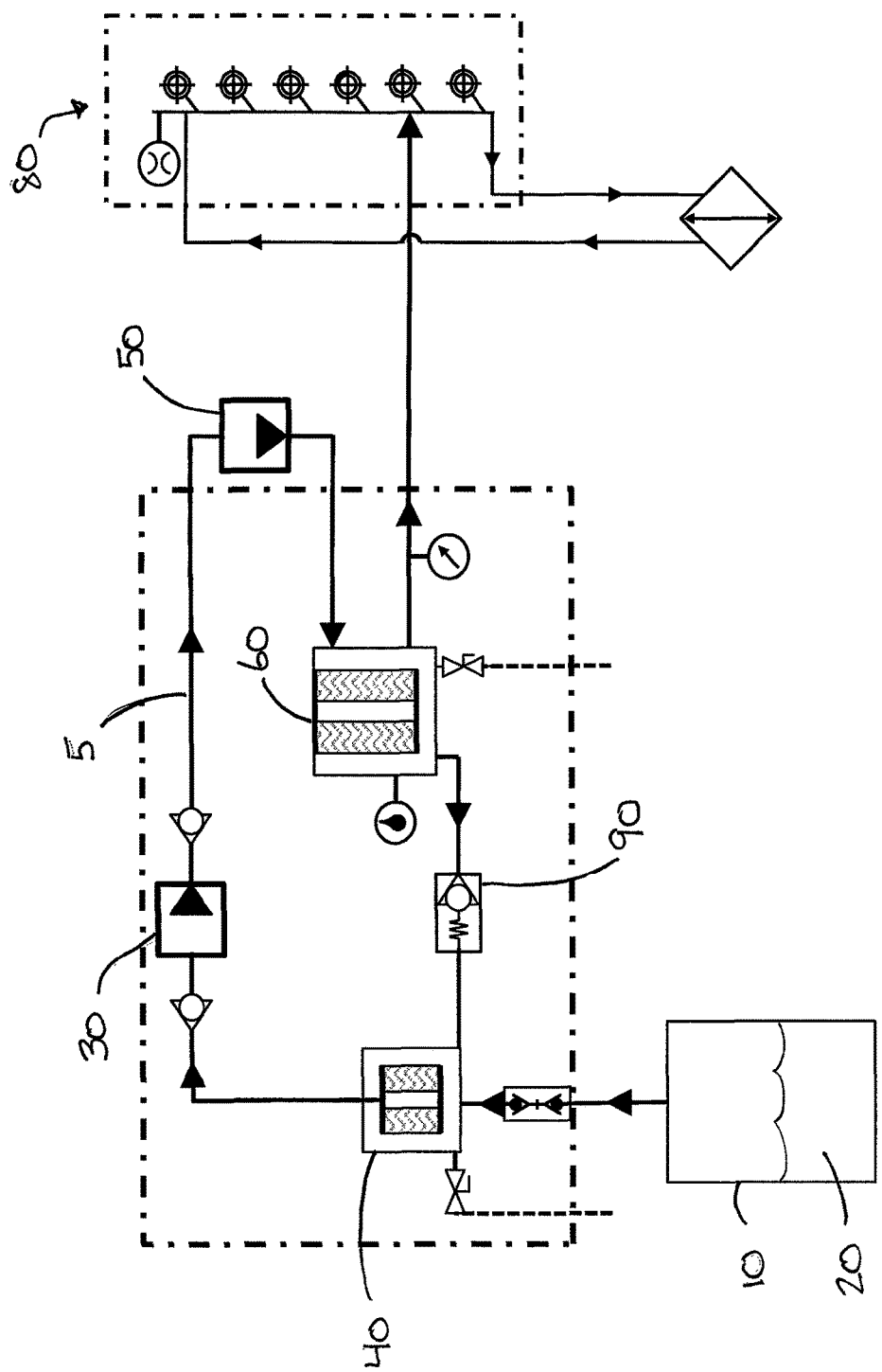
FIG. 1 is a fuel flow diagram that represents the OEM fuel pathway in an OEM engine.

Referring to FIG. 1, an OEM fuel delivery pathway 5 is illustrated. A fuel tank 10 stores an OEM fuel 20 until a priming pump 30 is activated, whereupon fuel is drawn through a strainer 40. In an embodiment, the strainer 40 can be a 150 mm mesh strainer and fuel heater, but those of skill in the art will recognize that other types of strainers can be used. Next, the OEM fuel 20 passes through a transfer lift pump 50 and into a fuel filter 60 that can optionally also be a water separator. In this OEM configuration, the OEM fuel 20 is then delivered to the engine 80 where it is combusted. Excess OEM fuel 20 that is not sent to the engine 80 is circulated back to the strainer 40 after passing through a fuel regulation valve 90.

Figure 2:
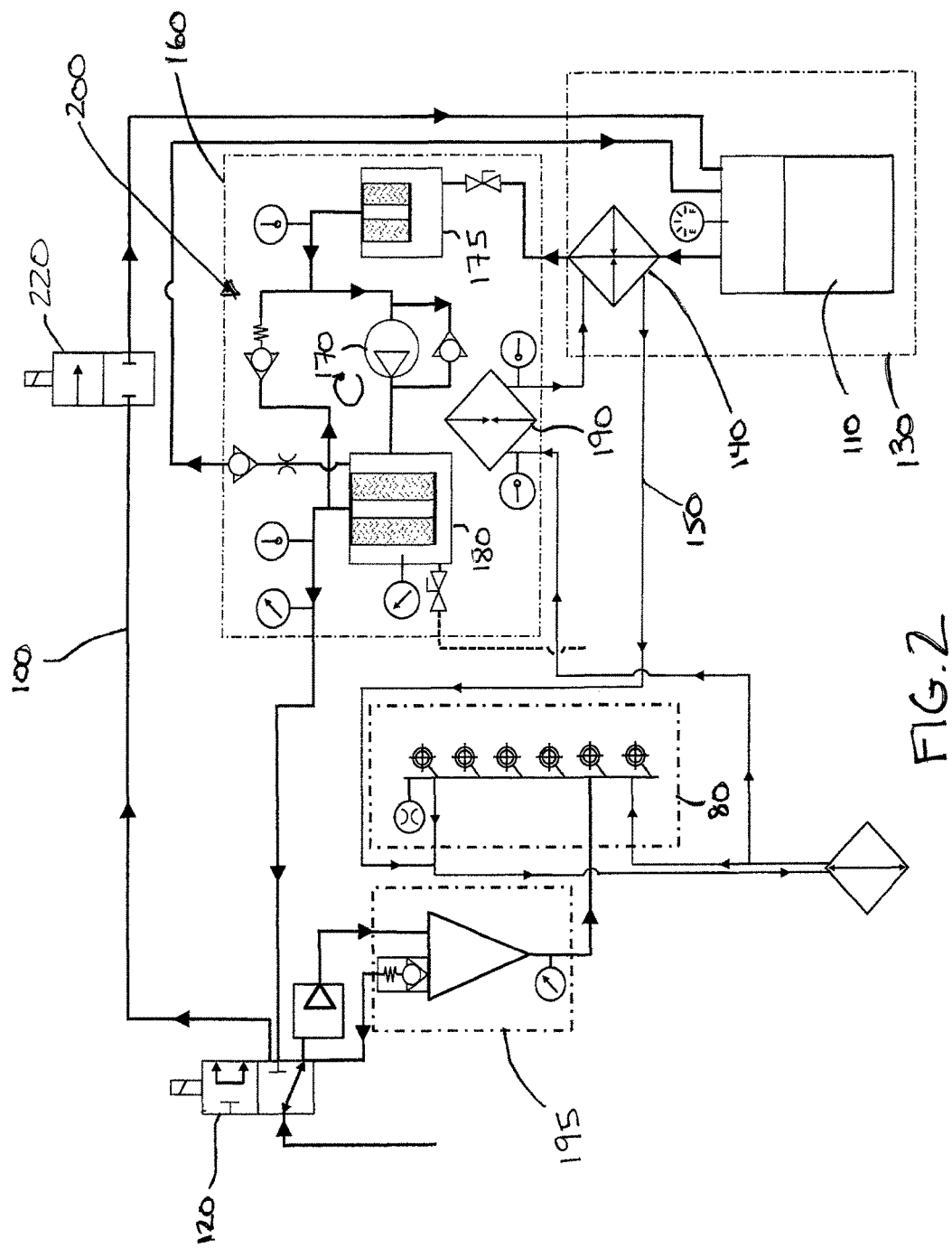
FIG. 2 is an alternative fuel flow diagram that illustrates the alternative fuel pathway in a presently preferred embodiment of the present invention.
Figure 3:
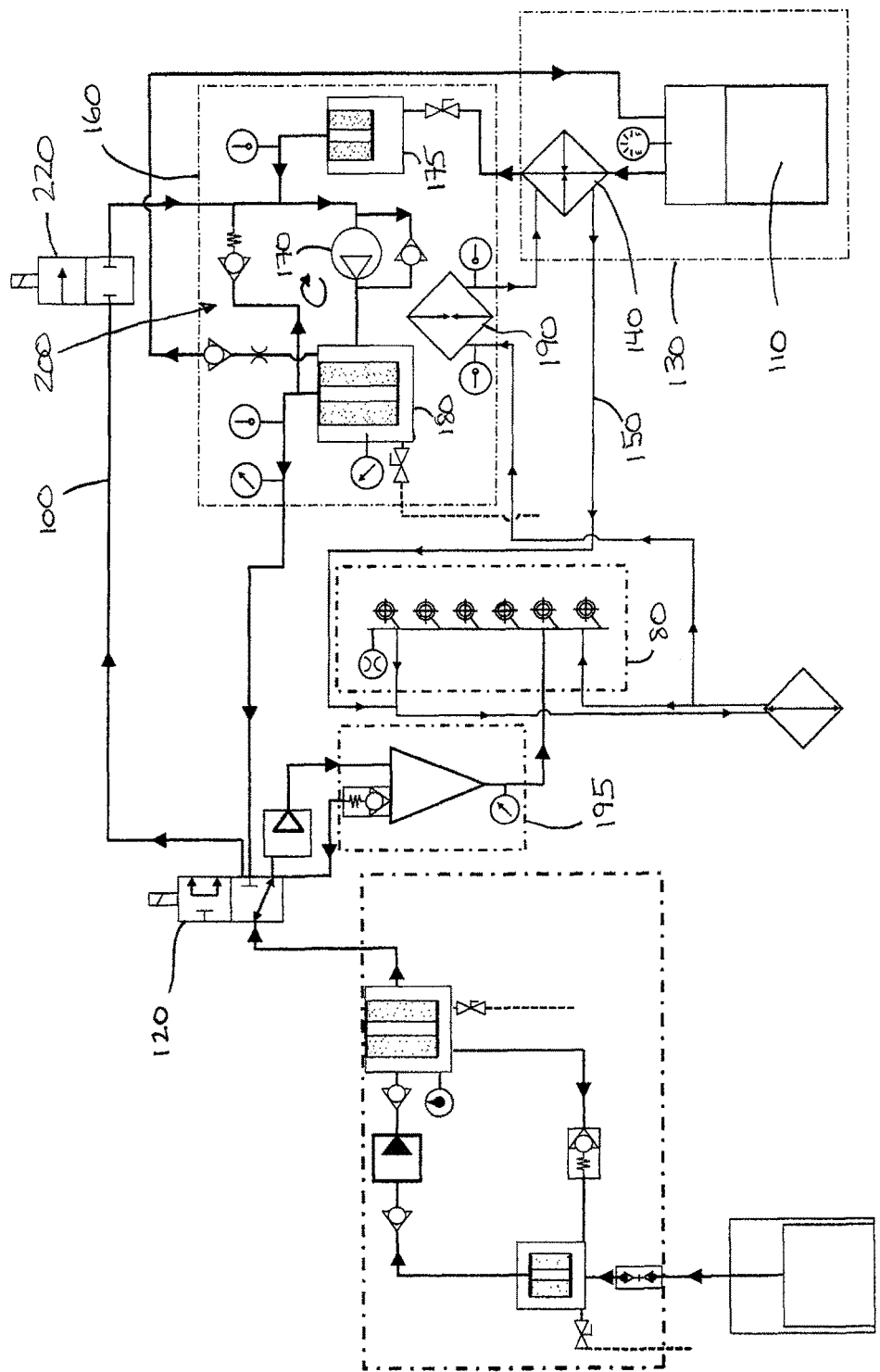
FIG. 3 is a fuel flow diagram illustrating both the alternative fuel pathway and the OEM fuel pathway in an embodiment consistent with the present invention.

FIG. 2 illustrates a fuel pathway 100 of an alternative fuel that is to be brought to an optimal temperature before being delivered to the engine 80. FIG. 3 is an overview diagram of both the OEM fuel delivery pathway 5 and the alternative fuel pathway 100. For ease of illustration, the OEM fuel delivery pathway 5 is not shown in FIG. 2.

Referring to FIGS. 2 and 3, an alternative fuel tank 130 contains an alternative fuel 110. In a preferred embodiment, the alternative fuel tank 130 is constructed of aluminum because typical biofuels such as biodiesel, vegetable oil and renewable diesel react with steel or high carbon-content materials. The tank 130 also houses a heat exchanger 140 so that the fuel can be temperature-conditioned. In a preferred embodiment, the heat exchanger 140 is supplied with coolant 150 that has been heated by combustion in the engine 80 and that heat is transferred to the fuel 110 in order to condition it. When directed by an electronic control unit (ECU)(not shown), alternative fuel 110 is pumped out of the alternative fuel tank 130 by a priming pump 170 in fluid communication with the fuel tank 130 and into the alternative fuel conditioning manifold 160. Once in the manifold 160, the fuel 110 passes through a pre-filter 175, such as a 150 micron filter, and then through a primary filter 180, such as a 5 micron filter. Depending on instructions from the ECU regarding the readiness of the fuel, the fuel selector valve 120 may be opened and the fuel delivered through a bi-fuel plate 195 to the engine 80, or if the fuel is not yet ready, selector valve 120 remains closed and the fuel 110 will be recirculated through the manifold 160 or alternatively recirculated back to the alternative fuel tank 130, until it has reached the proper temperature. The manifold 160 also contains a manifold heat exchanger 190 that receives heated coolant 150 from the engine 80 and uses it to increase the temperature of the fuel 110 in the alternative fuel pathway 100.

The fuel conditioning manifold 160 comprises a fuel conditioning circulation loop 200 by which fuel is circulated and heated until it reaches the optimal temperature and viscosity. Once the proper temperature and viscosity for the fuel is reached, it is delivered to the engine 80 for combustion. As the fuel is temperature conditioned, the circulation loop 200 remains closed to the engine 80, which burns the OEM fuel. When the ECU directs the selector valve to switch from OEM fuel to alternative fuel, temperature conditioned fuel from the circulation loop 200 flows to the engine 80. At the time of actuation at the fuel selector valve 120, fuel flow from the OEM fuel delivery pathway 5 ceases.

Figure 4:
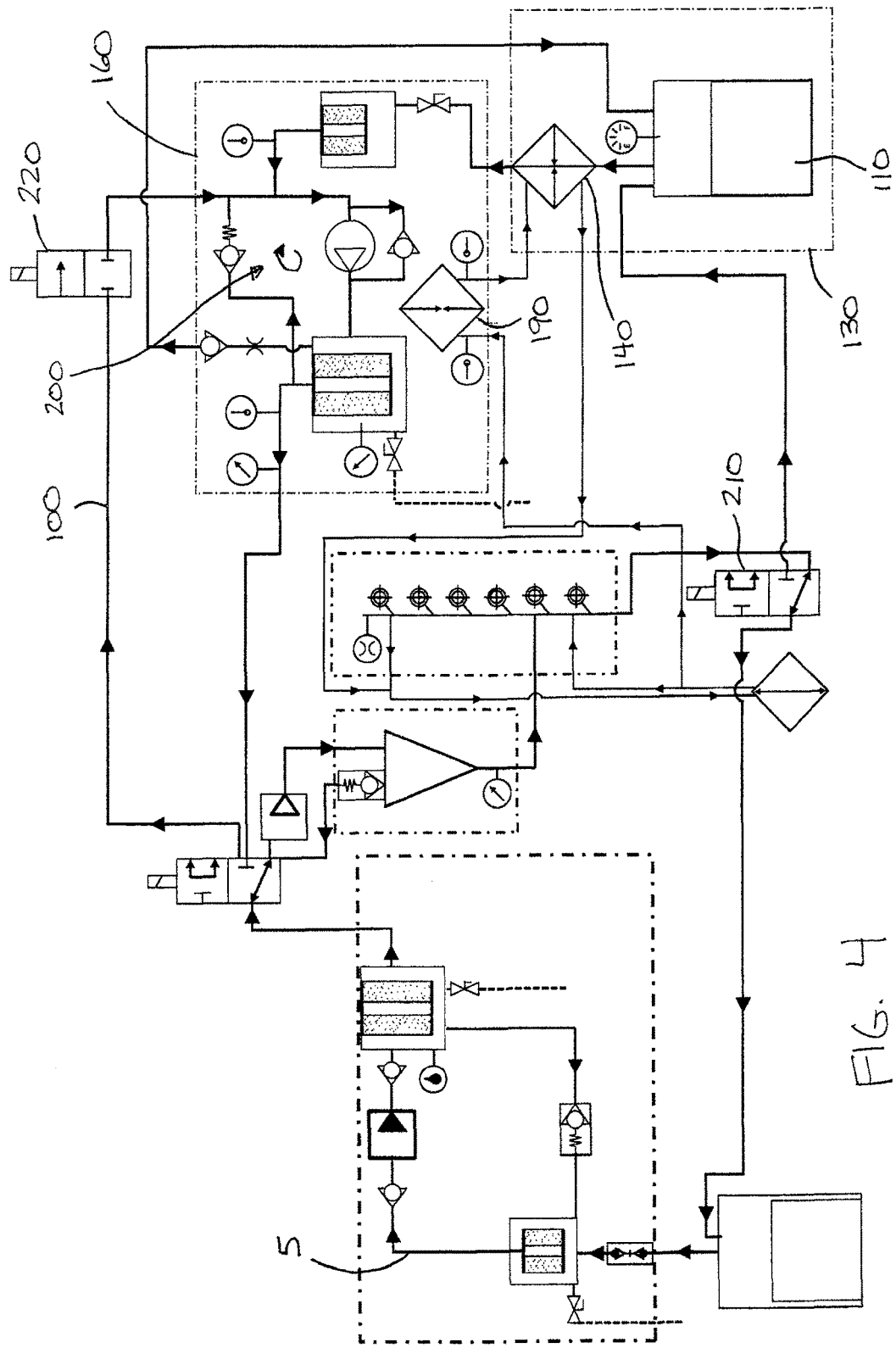
FIG. 4 illustrates another embodiment of the fuel flow of the present invention.

FIG. 4 depicts the OEM fuel delivery pathway 5 and an alternate embodiment of the alternative fuel pathway 100 of the present invention. The arrows in the figure depict the flow direction of the fuel being transported along transport vessels such as hoses or other conduits as will be readily apparent to one of skill in the art, for example. It is important to note that the OEM fuel delivery pathway 5 operates independently of the system of the present invention.

With further reference to FIG. 4, alternative fuel is transported from the tank 130 to the fuel conditioning manifold 160. As discussed, both the tank 130 and the manifold 160 have heat exchangers 140, 190 that run coolant heated by the engine in a manner that heats the fuel. Prior to delivery to the engine system 80, the fuel is also moved through the circulation loop 200 within the fuel conditioning manifold 160 where it is monitored by the ECU. In this embodiment, however, any excess fuel that is not used by the engine 80 is also routed back to the alternative fuel tank 130 by the post-engine fuel return valve 210.

Figure 5:
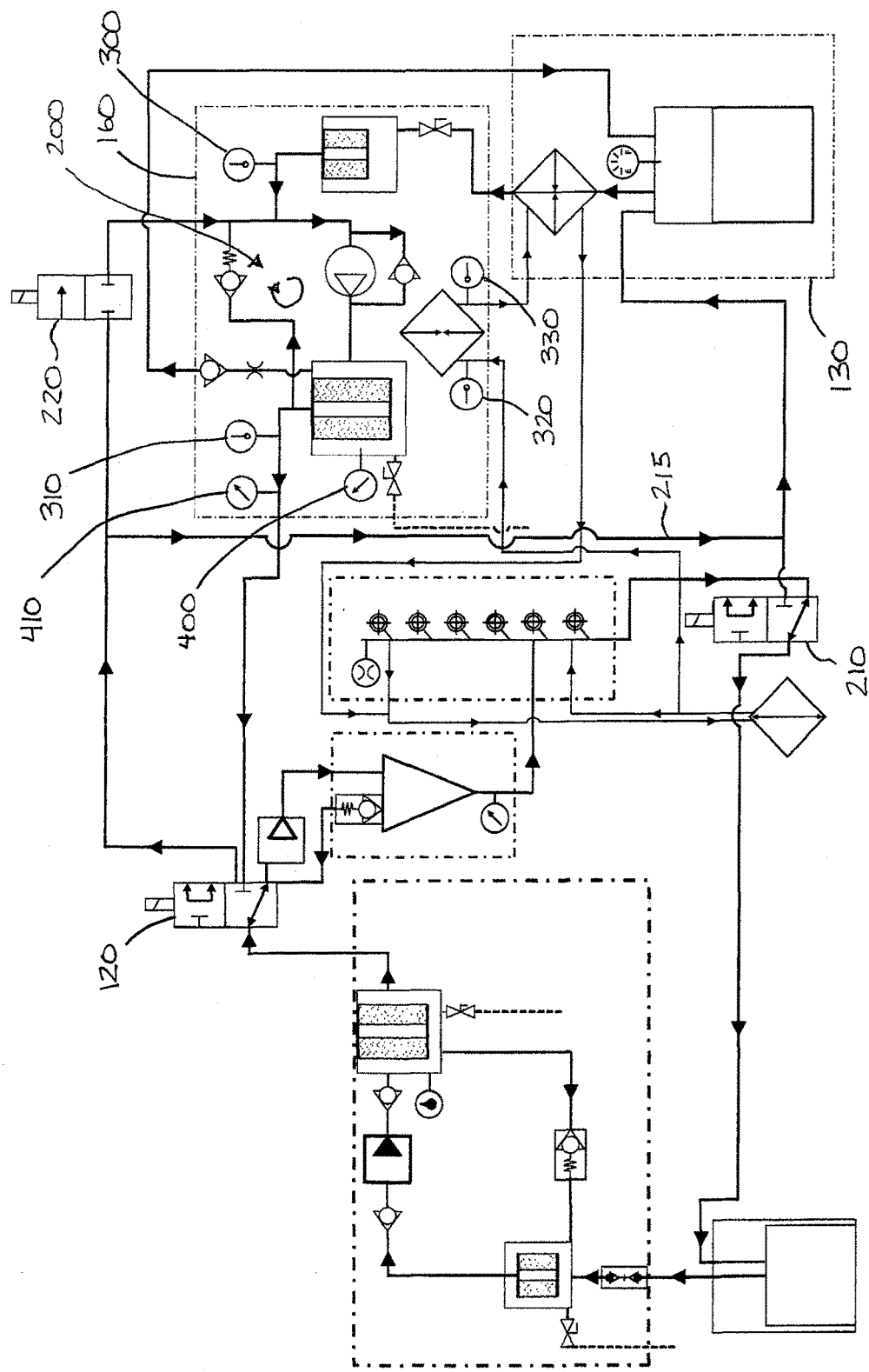
FIG. 5 illustrates a fuel flow diagram consistent with yet another embodiment constructed in accordance with the teachings of the present invention.

FIG. 5 illustrates a variation on the embodiment of FIG. 4 wherein the alternative fuel can be optionally routed via by-pass conduit 215 directly back to the fuel tank 130, by-passing the manifold 160. This configuration will be readily apparent to one of skill in the art and is intended to be employed where engine configuration and space considerations dictate that routing back to the manifold 160 from the fuel selector valve 120 is improvident.

In embodiments, the ECU comprises a microprocessor connected to a memory facility, such as software or firmware, containing at least a list of fuel compositions and optimal combusting temperatures therefor. The ECU is also electronically connected to the original OEM engine ECU and also to sensors distributed throughout the system designed to provide real-time data concerning temperatures and pressures at various locations in order to compare those readings to the optimal numbers stored in memory. It is also preferred that the ECU contain control systems for actuating the pumps and valves described in relation to FIGS. 2 through 5 when conditions warrant, as will be more fully described.

In a preferred embodiment, the overall system of the disclosed invention operates as follows. The ignition key of a vehicle outfitted with the system of the present invention is switched to "on", which triggers an ignition start cycle. The ECU then begins sending and receiving signals from the OEM engine ECU and optionally collects the temperature of the alternative fuel, at the same time, a user interface displays the status of the auxiliary fuel system and the alternative fuel level to the operator. If the operator then starts the engine, it will be running on the OEM fuel, which in most cases is diesel. As the engine warms up, the engine coolant begins to increase in temperature and the ECU monitors the OEM engine ECU to see if there are any fault codes or failure indicators. At this point, the priming pump 170 is off, the circulation valve 220 is shut and the fuel selector valve 120 is set to block the alternative fuel.

As the engine warms up, the coolant temperature increases and continues to circulate to the manifold heat exchanger 190 and the fuel tank heat exchanger 140. In an embodiment of the system of the present invention, the coolant line leading out of the heater core of the OEM engine is spliced into and diverted, in part, to the manifold heat exchanger and/or the fuel tank heat exchanger. The return line, in this embodiment, splices into the OEM line leading into the OEM heater core. When the alternative fuel temperature reaches a pre-determined temperature, the ECU activates the alternative fuel pump 170 to begin conditioning the alternative fuel. At the same time, the circulation valve 220 opens and the fuel begins to circulate in the circulation loop 200. At this point, the system is in warm-up mode and the ECU is continuously monitoring engine RPM, fuel and coolant temperature, fuel pressure and fuel level in the alternative fuel tank 130.

The temperature of the alternative fuel continues to increase while in warm-up mode. Once it reaches the designated optimal pre-determined temperature for the type of fuel being used, the ECU closes the circulation valve 220, thus building pressure in the alternative fuel system because the fuel selector valve 120 is still closed to the alternative fuel. At the appropriate pressure, the fuel selector valve 120 simultaneously opens to the alternative fuel and closes to the OEM fuel. This is the alternative fuel mode and is the mode the ECU is in the majority of the running time of the vehicle. If the ECU detects that the alternative fuel tank is depleted, it will actuate the fuel selector valve 120 to switch to OEM fuel until such time as the alternative fuel is replenished.

In an alternative embodiment, the post-engine fuel return valve 210 actuates on a time delay with respect to the fuel selector valve 120 actuation to allow for evacuation of diesel fuel from the conduits prior to circulating back to the respective tanks At the end of the vehicle duty cycle, the operator removes the key, prompting the ECU to conduct a purge cycle to remove the alternate fuel from all shared lines while the vehicle is still running The ECU then switches the fuel selector valve to allow OEM fuel to flow to the engine once again and to block the alternative fuel. In embodiments, the post-engine fuel return valve 210 closes on a time delay so that the alternative fuel can be removed from the lines and returned to the alternative fuel tank. After the purge cycle is complete and the engine is once again running on OEM fuel, the engine is turned off.

Referring again to FIG. 5, presently preferred locations for the temperature sensors are at a first location 300 in the alternative fuel line within the manifold, a second location 310 between the circulation loop and the fuel selector valve, a third location 320 in the coolant line prior to entry into the manifold heat exchanger and a fourth location 330 in the coolant line just after exiting from the manifold heat exchanger. Pressure sensors are preferably located at a first location 400 in the circulation pathway and at a second location 410 between the circulation loop and the fuel selector valve 120.

While in accordance with the patent statutes, the presently preferred and various alternative embodiments of the instant invention have been described in detail above, it should be understood that various other modifications and alternatives can be envisioned by those persons of skill in the art without departing from either the spirit of the invention or the scope of the appended claims.

We claim:

1. A fuel conditioning and delivery system for selectively delivering either an OEM fuel or a conditioned alternative fuel to an internal combustion engine that uses coolant to remove excess heat from the engine, comprising:
    an alternative fuel tank to store the alternative fuel;
    a fuel conditioning manifold comprising at least a fuel conditioning circulation loop in fluid communication with the alternative fuel tank and a manifold heat exchanger, the circulation loop comprising at least one alternative fuel pump, one or a plurality of sensors, and one or a plurality of circulation valves;
    a fuel selector valve in fluid communication with both the fuel conditioning circulation loop and the engine for selectively directing either a flow of OEM fuel or a flow of alternative fuel into the engine; and
    an electronic control unit in electronic communication with the alternative fuel tank, the fuel conditioning manifold and the fuel selector valve whereby alternative fuel is not supplied to the engine until it is conditioned.

2. The fuel conditioning and delivery system of claim 1, wherein the electronic control unit is in electronic communication with the at least one alternative fuel pump, the one or a plurality of sensors, the one or a plurality of circulation valves and the fuel selector valve.

3. The fuel conditioning and delivery system of claim 2, wherein the electronic control unit is also in electronic communication with an OEM electronic control unit.

4. The fuel conditioning and delivery system of claim 1, wherein the manifold heat exchanger is in fluid communication with coolant from the engine, which is used to heat the alternative fuel circulating within the fuel conditioning circulation loop.

5. The fuel conditioning and delivery system of claim 4, wherein the coolant delivered to the manifold heat exchanger comes from an OEM heater core.

6. The fuel conditioning and delivery system of claim 1, wherein the alternative fuel tank further comprises a fuel tank heat exchanger for conditioning alternative fuel in the tank.

7. The fuel conditioning and delivery system of claim 6, wherein the fuel tank heat exchanger is supplied with coolant that had been heated as it passed through the engine, whereby the alternative fuel is conditioned.

8. The fuel conditioning and delivery system of claim 1, wherein the electronic control unit has memory that stores a predetermined combustion temperature for the alternative fuel.

9. The fuel conditioning and delivery system of claim 1, wherein at least one of the sensors is a temperature sensor.

10. The fuel conditioning and delivery system of claim 9, wherein the electronic control unit signals the fuel selector valve to open after the alternative fuel in the circulation loop reaches a predetermined combustion temperature.

11. The fuel conditioning and delivery system of claim 1, wherein the circulation loop further comprises at least one fuel filter.

12. A method of selectively delivering either an OEM fuel or an alternative fuel to an engine comprising:
    pumping the alternative fuel out of an alternative fuel tank and into a conditioning manifold;
    circulating the alternative fuel within the manifold so that it is heated by a heat exchanger;
    sensing a temperature of the alternative fuel in the manifold;
    opening a fuel selector valve connected to the manifold when the alternative fuel reaches a predetermined temperature; whereby the alternative fuel enters the engine to be combusted.

13. The method of claim 12, further comprising conditioning the alternative fuel in the alternative fuel tank before it is pumped to the manifold.

14. The method of claim 12, further comprising blocking the circulation of the alternative fuel temporarily prior to opening the fuel selector valve in order to build alternative fuel pressure.

15. The method of claim 12, further comprising sensing when an ignition start cycle is commenced prior to pumping the alternative fuel out of the alternative fuel tank.

16. A method of selectively using an alternative fuel instead of an OEM fuel, the alternative fuel needing to be conditioned in an engine comprising:

sensing that the engine has been started using the OEM fuel;

pumping the alternative fuel into a circulation loop and heating the alternative fuel;

monitoring a temperature of the alternative fuel in the circulation loop;

selectively using the alternative fuel instead of the OEM fuel when the alternative fuel reaches a pre-determined temperature.

17. The method of using an alternative fuel of claim 16, further comprising sensing when the alternative fuel has run out and selectively using the OEM fuel.

18. The method of using an alternative fuel of claim 16, further comprising closing a circulation loop valve when the alternative fuel has reached the pre-determined temperature so that pressure builds to a recommended amount before the alternative fuel is delivered to the engine.

19. The method of using an alternative fuel of claim 16, further comprising purging the engine and return lines of the first fuel before introducing the alternative fuel to the engine.

20. The method of using an alternative fuel of claim 16, further comprising sensing that the engine has been turned off and purging the engine and return lines of alternative fuel before powering off.

* * * * *